US008253417B2

(12) United States Patent
Pislak et al.

(10) Patent No.: US 8,253,417 B2
(45) Date of Patent: Aug. 28, 2012

(54) ELECTROLOCATION APPARATUS AND METHODS FOR MAPPING FROM A SUBTERRANEAN WELL

(75) Inventors: Thomas J. Pislak, Cypress, TX (US); Qi Qu, Spring, TX (US); Russell L. Maharidge, Spring, TX (US)

(73) Assignee: Baker Hughes Incorporated, Houston, TX (US)

( * ) Notice: Subject to any disclaimer, the term of this patent is extended or adjusted under 35 U.S.C. 154(b) by 86 days.

(21) Appl. No.: 12/421,061

(22) Filed: Apr. 9, 2009

(65) Prior Publication Data

US 2009/0256575 A1 Oct. 15, 2009

Related U.S. Application Data

(60) Provisional application No. 61/044,153, filed on Apr. 11, 2008.

(51) Int. Cl.
*G01V 3/00* (2006.01)
(52) U.S. Cl. ........ 324/353; 324/366; 324/369; 324/373; 166/250.1
(58) Field of Classification Search .......... 324/323–375; 166/250.1, 244.1–403, 250.01–250.17; 367/1–86; 73/152.01–151.62; 702/1–199; 343/703, 343/709, 718–719
See application file for complete search history.

(56) References Cited

U.S. PATENT DOCUMENTS

| 1,819,923 A | 8/1931 | Schlumberger |
| 1,913,293 A | 6/1933 | Schlumberger |
| 3,012,893 A | 12/1961 | Kremzner et al. |
| 3,985,909 A | 10/1976 | Kirkpatrick |
| 4,289,794 A | 9/1981 | Kleiner et al. |
| 5,603,971 A | 2/1997 | Porzio et al. |
| 5,756,136 A | 5/1998 | Black et al. |
| 5,929,437 A | 7/1999 | Elliott et al. |
| 6,023,168 A * | 2/2000 | Minerbo ....................... 324/373 |
| 6,187,351 B1 | 2/2001 | Porzio et al. |
| 6,330,914 B1 * | 12/2001 | Hocking et al. ........... 166/250.1 |
| 6,371,917 B1 | 4/2002 | Ferrara et al. |
| 6,562,256 B1 | 5/2003 | Fleming et al. |
| 6,652,895 B2 | 11/2003 | Porzio et al. |
| 7,134,492 B2 | 11/2006 | Willberg et al. |

(Continued)

FOREIGN PATENT DOCUMENTS

WO 84/02838 A1 8/1984

(Continued)

OTHER PUBLICATIONS

Gerhard Von Der Emde et al., "Electric fish measure distance in the dark", Nature, Oct. 29, 1998, vol. 395, pp. 890-894.

(Continued)

*Primary Examiner* — Jermele M Hollington
*Assistant Examiner* — Alesa Allgood
(74) *Attorney, Agent, or Firm* — E. Randall Smith; Jones & Smith, LLP

(57) ABSTRACT

In some embodiments, apparatus useful for determining at least one dimension of at least one geological feature of an earthen formation from a subterranean well bore includes at least two electric current transmitting electrodes and at least two sensing electrodes disposed in the well bore. The electric current transmitting electrodes are configured to create an electric field and the sensing electrodes are configured to detect perturbations in the electric field created by at least one target object.

25 Claims, 8 Drawing Sheets

U.S. PATENT DOCUMENTS

| | | | |
|---|---|---|---|
| 7,424,911 B2 * | 9/2008 | McCarthy et al. | 166/250.12 |
| 7,819,181 B2 * | 10/2010 | Entov et al. | 166/66 |
| 2004/0040707 A1 * | 3/2004 | Dusterhoft et al. | 166/279 |
| 2005/0272611 A1 | 12/2005 | Lord et al. | |
| 2007/0106006 A1 | 5/2007 | Cooper et al. | |
| 2007/0161515 A1 | 7/2007 | Bicerano | |
| 2007/0202318 A1 * | 8/2007 | Smith et al. | 428/323 |
| 2008/0125335 A1 | 5/2008 | Bhavsar | |
| 2008/0208054 A1 | 8/2008 | Azuma et al. | |
| 2009/0157322 A1 | 6/2009 | Levin | |
| 2009/0179649 A1 | 7/2009 | Schmidt et al. | |
| 2009/0211754 A1 | 8/2009 | Verret et al. | |
| 2009/0250216 A1 | 10/2009 | Bicerano | |
| 2010/0038083 A1 | 2/2010 | Bicerano | |
| 2010/0158816 A1 | 6/2010 | Kawabata et al. | |
| 2012/0031613 A1 | 2/2012 | Green | |

FOREIGN PATENT DOCUMENTS

| | | |
|---|---|---|
| WO | 2009/032996 A2 | 3/2009 |
| WO | 2009/047781 A2 | 4/2009 |

OTHER PUBLICATIONS

James R. Solberg et al., "Robotic Electrolocation: Active Underwater Target Localization with Electric Fields", Proceedings of the 2007 International Conference of Robotics and Automation (ICRA), Apr. 10-14, 2007, Rome, Italy.

James R. Solberg et al., "Active Electrolocation for Underwater Target Localization", The International Journal of Robotics Research, May 2008, vol. 27, No. 5, pp. 529-548.

Brennan, Christopher Earls. "Cavitation and Bubble Dynamics", Oxford University Press 1995, ISBN 0-19-509409-3, http://caltechbook.library.caltech.edu/archive/00000001/00/bubble.htm, 254 pages.

Nano Resbots: Navigating the Reservoirs of Tomorrow, Saudi Aramco, Mar. 6, 2008, http://www.rigzone.com/news/article.asp?a_id=57957, 2 pages.

Mark Halper, Global Business: Norway's Power Push. Is osmosis the answer to the world's energy shortage? Why the "salient gradient" holds promise, TIME, Dec. 13, 2010, Pages Global 1-2, vol. 176.

\* cited by examiner

ELECTROLOCATION APPARATUS AND METHODS FOR MAPPING FROM A SUBTERRANEAN WELL

This application claims priority to U.S. provisional patent application Ser. No. 61/044,153 filed Apr. 11, 2008, entitled "Electrolocation Technique for Hydraulic Fracture Mapping", which is hereby incorporated by reference herein in its entirety.

FIELD OF THE INVENTION

The present disclosure relates generally to assessing geometry in or around subterranean wells and includes, for example, embodiments directed to electrolocation techniques for hydraulic fracture mapping.

BACKGROUND OF THE INVENTION

In various operations conducted via underground wells, it is often advantageous to be able to assess the geometry of the well or surrounding area. One example is in the mapping of hydraulic fractures in hydrocarbon production wells. Hydraulic fracturing is a widely used process for stimulating oil and gas wells and typically involves injecting fluid into the well bore at a higher pressure than the surrounding reservoir pressure. The higher pressure of the injected fluids causes the formation to fracture and thereby increase the surface area through which oil or gas may flow, thus increasing overall productivity of the well.

Once hydraulic fractures are formed, it is believed to be advantageous to learn about or map out the geometry or dimensions of the fractures, such as to increase the effectiveness of the fracturing process and hydrocarbon production. Existing techniques for visualizing underground geometries, such as hydraulic fracture propagations, include micro-seismic fracture mapping, tilt-meter fracture mapping and the use of tracers. These techniques are believed to have one or more drawbacks or limitations. For example, some of these techniques are believed to be limited to representing only one dimension of fracture geometry (e.g., length, height, depth, or azimuth). In some mapping techniques, fracture height may only be measured at the well bore. For other examples, some of the current mapping technologies require the use of an offset well, which may dramatically increase costs, and/or radioactive material, which may be environmentally damaging.

It should be understood that the above-described discussion is provided for illustrative purposes only and is not intended to limit the scope or subject matter of this disclosure, the appended claims or the claims of any related patent application or patent. Thus, none of the appended claims or claims of any related patent application or patent should be limited by the above discussion or required to address, include or exclude the above-cited examples, features and/or disadvantages merely because of their mention above.

Accordingly, there exists a need for improved systems, apparatus and methods capable of mapping underground areas or features from a subterranean well and having one or more of the attributes, capabilities or features described below or evident from the appended drawings.

BRIEF SUMMARY OF THE DISCLOSURE

In some embodiments, the present disclosure involves an electrolocation system for determining at least one dimension of at least one hydraulic fracture formed in an earthen formation from a subterranean well bore. The (at least one) hydraulic fracture is at least partially located within a zone of interest in the earthen formation proximate to the well bore. A fluid is disposed in the well bore and in fluid communication with at least one hydraulic fracture. At least two spaced-apart electric current transmitting electrodes are disposed in the well bore and configured to create an electric field between and proximate to them in the zone of interest of the earthen formation. At least one target object is disposed within the zone of interest and capable of creating perturbations in the electric field. At least two spaced-apart sensing electrodes are disposed in the well bore and configured to detect a difference therebetween in electric potential measured in volts caused by the target object(s). The perturbations of the target object(s) are useful to at least approximate one or more dimensions of at least one hydraulic fracture. Accordingly, one or more dimensions of at least one hydraulic fracture may be determined based upon information gathered in situ in the well bore with the use of electrolocation technology.

In many embodiments, the present invention involves apparatus for approximating or determining at least one dimension of at least two geological features of an earthen formation from a subterranean well bore. At least a first geological feature is at least partially located within a first zone of interest in the earthen formation that is proximate to the well bore and at least a second geological feature is at least partially located within a second zone of interest in the earthen formation that is proximate to the well bore. A fluid disposed in at least part of the well bore and in communication with the geological features. At least two spaced-apart electric current transmitting electrodes are positionable within the well bore and configured to create an electric field between and proximate to them. At least one target object is disposed within each zone of interest and capable of creating perturbations in an electric field extending therein. At least two spaced-apart sensing electrodes are positionable within the well bore and configured to detect a difference therebetween in electric potential caused by the target object(s) at each respective zone of interest and provide data relating thereto for use in approximating or determining at least one dimension of at least one geological feature at each zone of interest. At least one dimension of each geological feature may be approximated or determined based upon data obtained in situ in the well bore with the use of electrolocation technology.

In various embodiments, the present disclosure involves a method of approximating or determining at least one dimension of at least one fracture formed in an earthen formation by hydraulic fracturing from a subterranean well bore. The well bore includes fluid and the geological feature is at least partially located within a zone of interest in the earthen formation proximate to the well bore. The method includes providing at least two spaced-apart electric current transmitting electrodes in the well bore. The electric current transmitting electrodes are capable of creating an electric field in the zone of interest in the earthen formation. At least one target object is located within the zone of interest and is capable of generating detectable perturbations in the electric field. At least two sensing electrodes are provided in the well bore. The sensing electrodes are capable of detecting a difference therebetween in electric potential caused by the target object(s) and providing data about the detected perturbations to at least one computer. The data about the detected perturbations is useful to at least approximate one or more dimensions of at least one geological feature of the earthen formation.

Accordingly, the present disclosure includes features and advantages which are believed to enable it to advance underground mapping technology. Characteristics and potential advantages of the present disclosure described above and additional potential features and benefits will be readily apparent to those skilled in the art upon consideration of the following detailed description of various embodiments and referring to the accompanying drawings.

BRIEF DESCRIPTION OF THE DRAWINGS

The following figures are part of the present specification, included to demonstrate certain aspects of various embodiments of this disclosure and referenced in the detailed description herein.

DETAILED DESCRIPTION OF PREFERRED EMBODIMENTS

Figure 1:
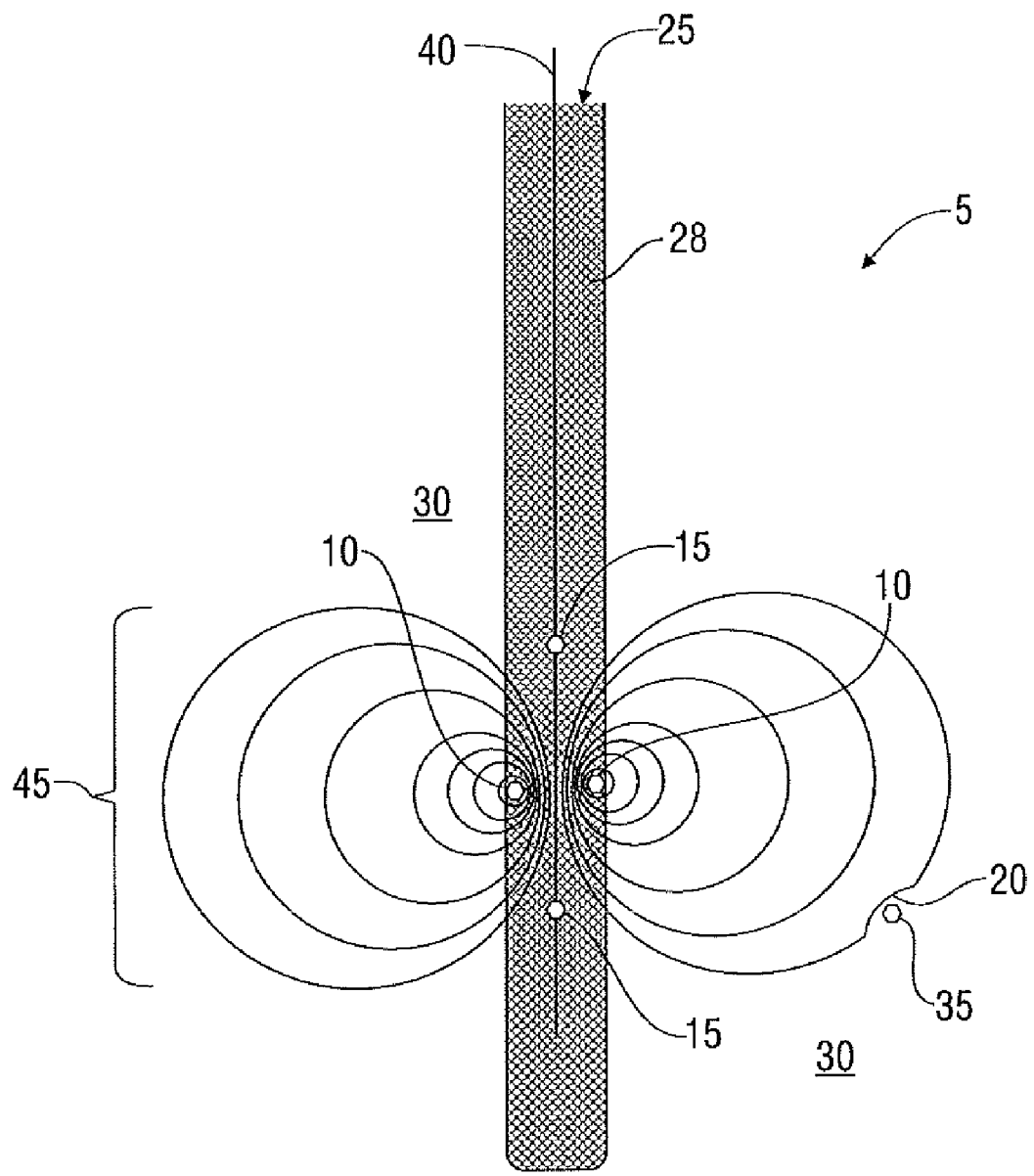
FIG. 1 is a schematic diagram showing an embodiment of an electrolocation system of the present disclosure disposed in a well bore.

Characteristics and advantages of the present disclosure and additional features and benefits will be readily apparent to those skilled in the art upon consideration of the following detailed description of exemplary embodiments of the present disclosure and referring to the accompanying figures. It should be understood that the description herein and appended drawings, being of example embodiments, are not intended to limit the claims of this patent application, any patent granted hereon or any patent or patent application claiming priority hereto. On the contrary, the intention is to cover all modifications, equivalents and alternatives falling within the spirit and scope of the claims. Many changes may be made to the particular embodiments and details disclosed herein without departing from such spirit and scope.

In showing and describing preferred embodiments, common or similar elements are referenced in the appended figures with like or identical reference numerals or are apparent from the figures and/or the description herein. The figures are not necessarily to scale and certain features and certain views of the figures may be shown exaggerated in scale or in schematic in the interest of clarity and conciseness.

As used herein and throughout various portions (and headings) of this patent application, the terms "invention", "present invention" and variations thereof are not intended to mean every possible embodiment encompassed by this disclosure or any particular claim(s). Thus, the subject matter of each such reference should not be considered as necessary for, or part of, every embodiment hereof or of any particular claim(s) merely because of such reference. The terms "coupled", "connected", "engaged" and the like, and variations thereof, as used herein and in the appended claims are intended to mean either an indirect or direct connection or engagement. Thus, if a first device couples to a second device, that connection may be through a direct connection, or through an indirect connection via other devices and connections.

Certain terms are used herein and in the appended claims to refer to particular components. As one skilled in the art will appreciate, different persons may refer to a component by different names. This document does not intend to distinguish between components that differ in name but not function. Also, the terms "including" and "comprising" are used herein and in the appended claims in an open-ended fashion, and thus should be interpreted to mean "including, but not limited to . . . ." Further, reference herein and in the appended claims to components and aspects in a singular tense does not necessarily limit the present disclosure or appended claims to only one such component or aspect, but should be interpreted generally to mean one or more, as may be suitable and desirable in each particular instance.

Referring initially to FIG. 1, an electrolocation system 5 in accordance with an embodiment of the present disclosure includes at least two emitting electrodes 10 and at least one sensing electrode 15 disposed within, or proximate to, an underground well bore 25. Fluid 28 is provided in the well bore 25, which is surrounded generally by an earthen formation 30. At least one target object 35 is located within a zone of interest 45 of the formation 30 adjacent to or near the well bore 25.

The exemplary emitting electrodes 10 are configured to create an electric field that reaches the zone of interest 45, while the sensing electrode(s) 15 detect perturbations 20 in the electric field caused by the target object(s) 35. Based upon data collected by the sensing electrodes 15 and with the application of electrolocation principals, at least one dimension of at least one portion of the formation 30 in the zone of interest 45, the well bore 25 or a geometric interface therebetween may be determined or estimated.

The electrolocation system 5 of the embodiment of FIG. 1 is located in-situ in the well bore 25 without requiring the use of an offset well (not shown) and is configured to provide data for mapping, or determining one or more dimensions of, at least one area or geological feature of the well bore 25 and/or adjacent formation 30. In the exemplary embodiment, at least one dimension of at least one hydraulic fracture (not shown) formed in the earthen formation 30 from the well bore 25, or accessible therefrom, may be determined or estimated using any suitable electrolocation technique(s). However, the present disclosure is not limited to determining dimension of hydraulic fractures. Some examples of other features that may be measured or mapped in accordance with the present disclosure are naturally occurring fractures, wormholes or channels created by matrix stimulation and the like.

Without being limited by theory, "electrolocation" is known to generally involve an electric field generated in a medium and objects located in the medium. The objects differ in impedance from the medium and other objects therein, and create distortions, or perturbations, in the electric field that can be detected by sensors. It should be noted, however, that while this general concept or process is referred to herein as "electrolocation", it may be referred to with the use of any other suitable terms, such as "electrosensing" and the like. Thus, the use of the term "electrolocation" is not intended to and should not be construed to be limiting upon the present disclosed or appended claims.

The detected data can be used to estimate or determine one or more characteristic of the objects such as, for example, the location of the objects. Further details about electrolocation and example electrolocation techniques, systems, applications and mathematical models relating thereto may be found in various publicly accessible documents and sources, including, without limitation, the article Emde et al., "Electric Fish Measure Distance in the Dark," Nature, vol. 395, pgs. 890-894 (Oct. 29, 1998), the article Solberg et al., "Robotic Electrolocation: Active Underwater Target Localization with Electric Fields," Proceedings of the 2007 International Conference on Robotics and Automation (ICRA), Apr. 10-14, 2007, Rome, Italy, pp. 1-16, and the article Solberg et al., "Active Electrolocation for Underwater Target Localization," The International Journal of Robotics Research, Vol. 27, No. 5, May 2008, pp. 529-548, each of which is hereby incorporated by reference herein in its entirety. However, the present disclosure is not limited to the details, techniques or applications disclosed in any of the above or any other references.

Referring still to FIG. 1, the emitting electrode(s) 10 may have any desired dimensions, form, construction, configuration, arrangement and operation suitable for emitting an electric current and creating an electric field. Without limitation, examples of suitable emitting electrodes 10 may include metal pieces or wire constructed of or coated with silver, gold, or other highly conductive materials. In this embodiment, the system 5 includes two emitting electrodes 10. However, in other embodiments, the system 5 may include any desired quantity of electrodes 10.

The emitting electrodes 10 may be spaced apart by any desired distance to provide a desired electric field in the well bore 25 and/or zone of interest 45. Generally, the size of the electric field depends, at least in part, by the distance between the emitting electrodes 10. Thus, an increase in distance between multiple emitting electrodes 10 may provide an increase in the distance the electric field extends, such as into the formation 30.

The sensing electrode(s) 15 may have any desired dimensions, form, construction, configuration, arrangement and operation suitable for detecting perturbations 20 in an electric field. Without limitation, examples of suitable sensing electrodes 15 may include metal pieces or wire constructed of or coated with silver, gold, or other highly conductive materials. In this embodiment, the system 5 includes two sensing electrodes 15. However, in other embodiments, the system 5 may include only one, or more than two, sensing electrodes 15. (It should be noted that in embodiments involving only one sensing electrode 15, it may be necessary or desirable to include at least one ground (e.g. the casing) or reference voltage disposed within or proximate to the well bore 25.)

The exemplary sensing electrodes 15 may be positioned at any desired location suitable for detecting perturbations 20 in the electric field. In the illustrated embodiment, the sensing electrodes 15 are suitably positioned in the well bore 25 in or along the zone of interest 45 in the formation 30 to be able to detect perturbations 20 in the electric field caused by the target object(s) 35.

Still referring to FIG. 1, the electrodes 10, 15 of the illustrated system 5 are carried on a wireline 40 that may be inserted into and removed from the well bore 25, as is and becomes further known. However, the electrodes 10, 15 may be delivered to the desired location in any suitable manner. For example, the electrodes 10, 15 may be carried on one or more drill string or other pipe, coiled tubing, tool or other component, or attached to or embedded in the casing (not shown) or cement disposed in the well bore 25 or other component.

Any suitable fluid 28 is provided or maintained in the well bore 25 to allow the electric field to be created and perturbations to be detectable. For example, the fluid 28 may be fracturing fluid introduced in the well bore 25 during fracture formation. In such instance, the electric field is created in the fracturing fluid between the emitting electrodes 10, such as by applying an electric current to the electrodes 10 to produce a difference in potential.

Still referring to the example of FIG. 1, the target objects 35 may be disposed in the zone of interest 45 in any suitable manner and include any desired structure, object or material capable of creating detectable perturbations in the electric field useful to approximate or determine the desired dimension(s) of the subject geological feature or area. For example, the target objects 35 may be positioned in the fracture(s) and possess an electrical impedance that differs from the impedance of the fluid 28 and/or other objects and structures in the well bore 25 and zone of interest 45. In some embodiments, the target object(s) 35 may be part of the earthen formation 30, such as the fracture or fracture surface (not shown) of the formation 30 and display a sufficient electrical contrast to everything else in the well bore 25 and/or zone of interest 45 (e.g. fluid, proppants, rock) to produce meaningful perturbation data. In other embodiments, the target objects 35 may be proppants that support the subject fracture(s) and which have sufficient electrical contrast.

In yet other embodiments, the target objects 35 may be material or particles contained within or carried by the proppants or fluid 28 provided in the well bore 25. Some examples are beads constructed of or coated with metal, plastic or other material capable of raising or lowering electrical conductivity, as may be desired depending upon the particular well conditions. In even other embodiments, the target objects 35 may include particles, such as, for example, nanoparticles, suspended in the fracturing or other fluid in the well bore 25.

In any case, any suitable material may be used or altered to provide a sufficient difference in electrical impedance as compared to the fluid 28, formation 30 and other material and objects in the well bore 25 and zone of interest 45 to create perturbations 20 in the electric field that may be detected by the sensing electrodes 15. Likewise, if desired, the target objects 35 may include a combination of the above or other examples. Moreover, different target objects 35 may be used at different times during operation of the system 5.

If desired, the target objects 35 may have a tunable, or variable, electrical impedance and thus be functionalized target objects. Increasing or decreasing the impedance of the functionalized target object could be useful to cause a desired interaction with the electric field and improve data accuracy based upon a particular conditions in the well bore 25. Target objects 35 may be functionalized in any suitable manner. For example, particles having a desired impedance may be added to the target objects 35 to make them functionalized target objects. In some embodiments, the particles may be coated onto, integrated into or mixed with the target objects 35. For one example, when the target objects 35 include nanoparticles suspended in fracturing fluid, iron nanoparticles may be added to increase the conductance and decrease the resistance of the target objects 35 and provide the desired interaction with the electric field.

In the embodiment of FIG. 1, the target objects 35 are located at the fractures (not shown) in the formation 30 in the zone of interest 45 and approximate at least part of the geometry of the fractures. Perturbations 20 in the electric field caused by the target objects 35 may thus be used to deduce at least part of the geometry of the fractures. For example, any among the approximate length (depth), width, height and azimuth of one or more fracture may be deduced from the output of the sensing electrodes 15. In some embodiments, width and height of the fracture(s) may be estimated. Other embodiments may be used to estimate depth. In still further embodiments, the deduced geometry may include the entire geometry of the subject fracture(s).

In an example operation of the embodiment of the present disclosure of FIG. 1, any suitable fluid, such as fracturing fluid or a brine, is provided into at least part of the well bore 25 and zone of interest 45. The exemplary emitting electrodes 10 are spaced a pre-established or desired distance apart and disposed at a suitable location in the well bore 25 to provide an electric field in the zone of interest 45 of the formation 30. The sensing electrodes 15 are spaced apart a pre-established, or desired, distance and disposed at a suitable location in the well bore 25 to detect perturbations of desired target objects 35 in the zone of interest 45. For example, the wireline 40 or other carrier(s) (coiled tubing, pipe string, downhole tool assembly, etc.) may be lowered to a desired position (e.g. at or near the bottom or toe of the well bore 25).

The emitting electrodes 10 provide an electric field into the zone of interest 45 and the sensing electrodes 15 detect perturbations from one or more target objects 35 located in the zone of interest 45. For example, the perturbations may be a detected change in electrical impedance caused by structures of the formation 30, such as fractures formed therein, or material placed in the fractures, such as proppant or nanoparticles, such as described above.

If desired, the system 5 may be used in mapping or approximating one or more dimension of one or more fractures (or other geological feature) in the formation along multiple intervals or angles in the well bore 25. If so, the wireline 40 (or other carrier) may be moved upwardly in the well bore 25 to locate the corresponding electrodes 10, 15 at a desired second position, such as a next higher fracture interval or area within the same fracture interval. At that location, an electric field may be provided into a new zone of interest by the emitting electrodes 10 and perturbations from one or more target objects 35 therein may be measured by the sensing electrodes 25, such as described above. This process may be repeated at multiple successive locations, as desired, such as corresponding to hydraulic fracture intervals, pre-determined spacing intervals or based upon any other criteria.

In other embodiments, multiple sets of corresponding electrodes 10, 15 may be disposed on the same wireline 40 or other carrier at spaced intervals so that after the wireline 40 or carrier is lowered into the well, perturbations can be measured at multiple locations without moving the wireline 40 or other carrier. In still further embodiments, multiple sets of corresponding electrodes 10, 15 may be embedded in, or connected with, a casing (not shown) or other fixture in the well bore 25 at desired intervals to measure perturbations from target objects at different locations. In various embodiments, the above procedure may be performed at the same time as pumping of the well or conducting other downhole operations.

After data is obtained by the system 5, any methods suitable for processing such information and ultimately deducing the desired dimensions, geometry or spatial relationships from the detected perturbations as is and become known in the art may be used. As an example, the above-cited "Solberg" references disclose algorithms for determining locations based on detected electrical perturbations. In the present embodiment, mathematical modeling techniques, as are and become further known, may be used to formulate and apply appropriate algorithms via one or more computing device to determine the relationship between detected perturbations and the boundaries or desired dimensions of associated fractures.

As described above, any suitable target objects 35 may be used to produce the desired data. For example, when the desired data involves dimensions of fractures in the formation, perturbation data may be recovered based upon the difference in electric conductivity between the fracture (hole) and the formation wall adjacent to the fracture and fluid 28 in the well bore 25. For another example, target objects 35, such as material having a different electrical conductivity, can be added to deliberately increase the electrical contrast and improve or enhance the perturbation readings.

Depending upon the accuracy or usefulness of the readings or changes in the downhole conditions, the impedance of the target objects 35 may be changed. In some instances, it may be desirable to add more or less conductive material to fracture fluid or proppants inserted into the fracture(s) to create a greater electrical contrast as compared to the fracture fluid itself, the proppant and/or earthen formation 30 around the fracture. Thus, at any stage in the exemplary process, if perturbation readings are insufficient, target objects 35 may be added or altered in any desired manner to increase or decrease electrical impedance and contrast, as necessary. For example, specialized proppants or particles, such as described above, may be inserted into the well bore 25 or mixed with fluid or proppants provided in the well bore 25.

Experimentation: background. Experiments were conducted to illustrate principals applicable in accordance with an embodiment of the present disclosure. However, it should be understood that the present disclosure and appended claims are in no way limited to any of the details of the experimentation as described below and shown in the referenced figures.

Figure 2:
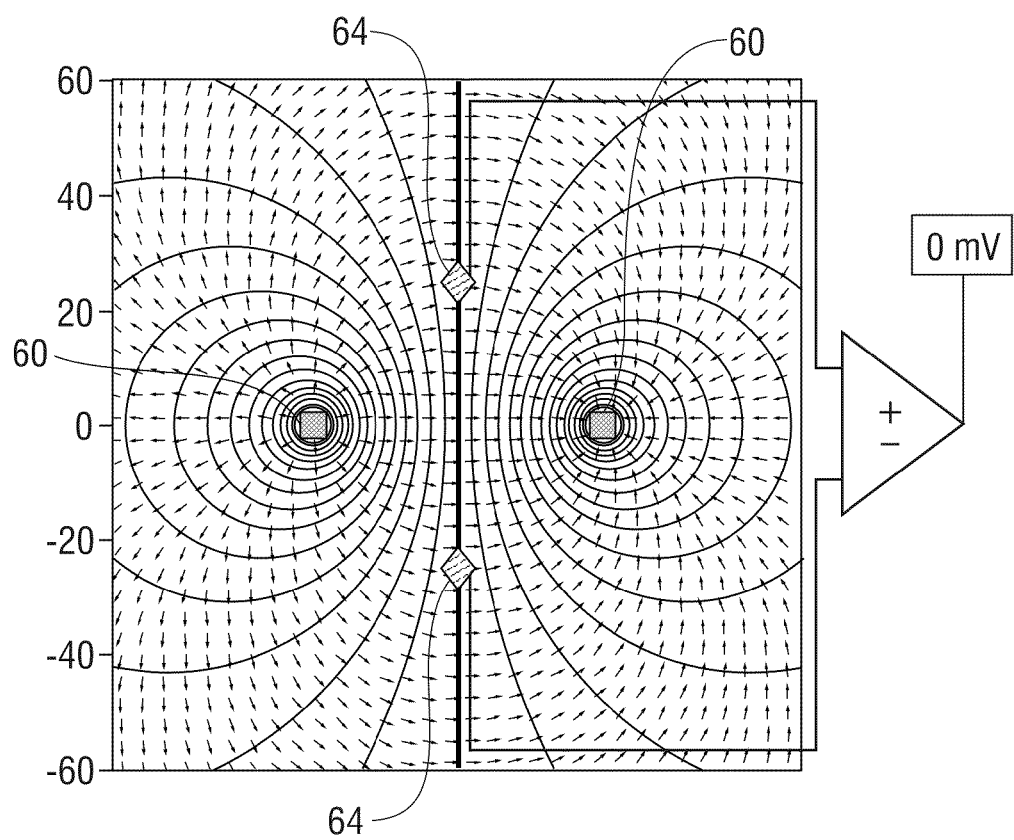
FIG. 2 is a schematic diagram of an unperturbed planar electric field used in experiments to illustrate principals applicable in accordance with an embodiment of the present disclosure.

To experimentally verify the ability to approximate one or more dimension, geometric feature or spatial relationship in a well bore, a device was built to generate 2V (peak-to-peak) biphasic 1 kHz square wave. Referring to FIG. 2, the electric field was generated between two submerged silver electrodes plated with silver chloride to improve the metal-water electrical interface. These were the emitting electrodes 60, which were positioned approximately 50 mm apart. Two sensing electrodes 64 were also positioned about 50 mm apart, forming an overall diamond pattern with the emitting electrodes 60. The pairs of emitting and sensing electrodes 60, 64 made up the electrode assembly 66 (e.g. FIG. 5). Both the emitting electrodes 60 and the sensing electrodes 64 were constructed of 0.38 mm diameter silver wires that were stabilized by 0.5 mm borate silicate glass pipettes. However, the electrodes 60, 64 are not limited to this specific composition, geometry and arrangement, but may be constructed of other materials and designed and arranged as desired to accommodate differing conditions, such as in subterranean oilfield applications. The positioning of the sensing electrodes 64 was established where they would give identical readings with no target objects present.

In measuring perturbations caused by one or more target object, the signals recorded at the sensing electrodes 64 were differentially amplified and the resulting signal, along with its negative, was sent to an analog switch. The analog switch passed one of the two input signals to an output according to a switching signal, which was the original square-wave used to generate the electric field. This served as a matched filter, since only sensory signals having the same frequency as the field signal have a nonzero time-averaged mean at the output of the analog switch. The final stage was a low-pass filter that outputs this mean value.

Two computers were used for information processing. One computer ran a real-time operating system (xPC, The Mathworks, Natick Mass. USA) and handled low-level control of movement and recording and filtering of the measurements. A second computer received the filtered data from the real-time computer, generated the next position of the electrode assembly (readings were taken at multiple locations) and sent such information to the real-time computer. All algorithms were implemented with commercial software (Simulink, Real Time Workshop, xPC Target, and MATLAB: The Mathworks, Natick Mass. USA).

Figure 3:
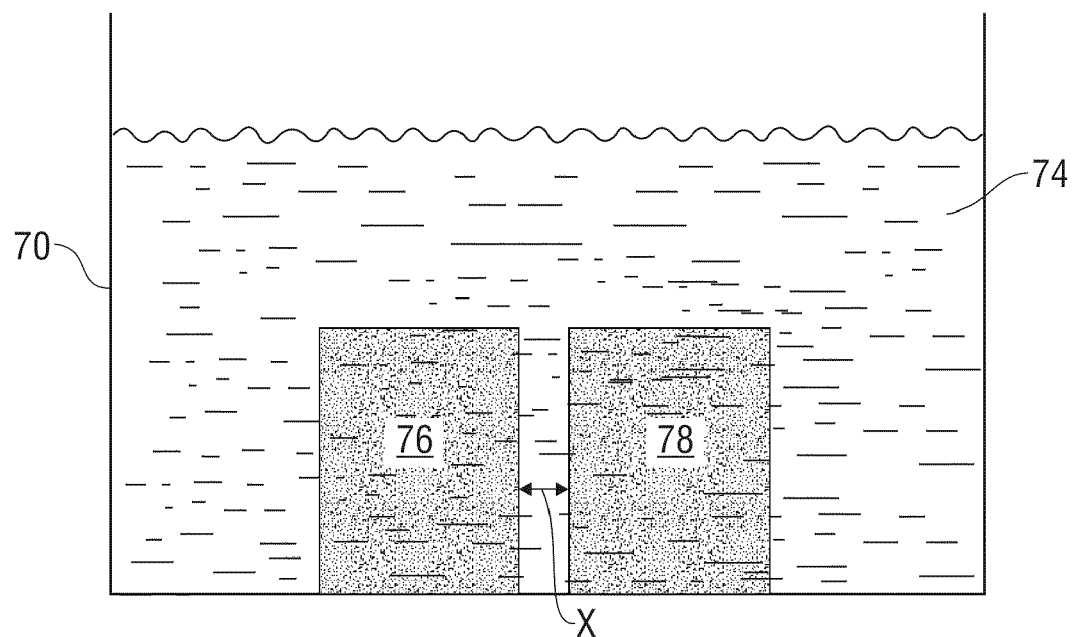
FIG. 3 is a front view of an example testing tank with experimental sandstone pieces used in a first example experiment to illustrate principals applicable in accordance with an embodiment of the present disclosure.

Experiments were conducted in a 750 mm by 750 mm glass tank 70 (e.g. FIG. 3) filled to a depth of approximately 160 mm. In order to minimize the effects of the tank walls on the electric field, experiments were conducted in a central region of 200 mm by 200 mm. Low concentration of NaCl aqueous solution 74 (e. g. FIG. 3) was used in the experiments, although other types of brines may instead be used. All tests were done at ambient conditions.

Experiment #1: measurement of the gaps between sandstone rocks. As shown in FIG. 3, two pieces of sandstone rock 76, 78 were placed in the tank 70 and separated by gap x. The facing sides of the sandstone pieces 76, 78 represented the target objects. This experiment simulated using electrolocation to measure the width and height of a crack, such as a fracture in an earthen formation. The electric field potential was measured (as outlined above) and an isopotential map was produced. This process was repeated multiple times, each time varying the gap (x value) ranging from 0-16 mm.

Figure 4:
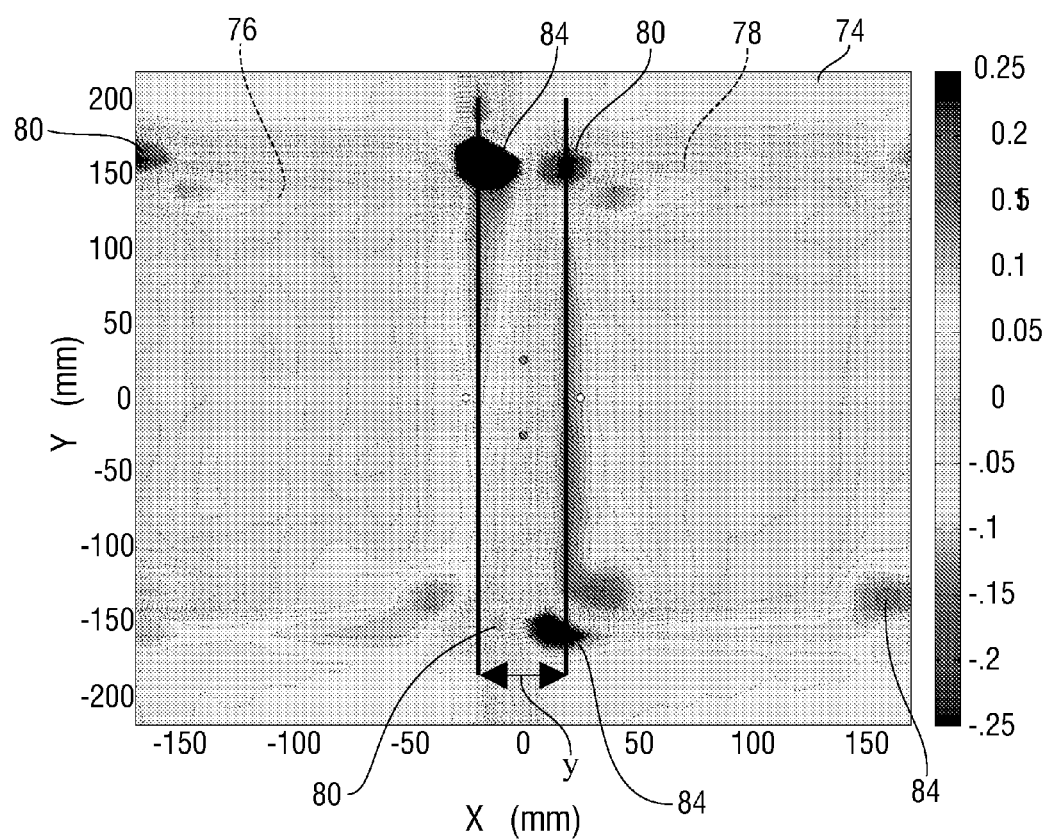
FIG. 4 is a two dimensional isopotential map from a three-dimensional graphical representation showing results generated in the first example experiment.

FIG. 4 illustrates an example isopotential map that was generated. Electrical potential that was lower than that of the fluid is represented in blue. The areas of lowest potential are represented with concentrated blue areas, or lobe slices 80. Electrical potential that was higher than that of the fluid is represented in red. The areas of highest potential are represented with concentrated red areas, or lobe slices 84.

As shown, the map provides a general outline of the blocks 76, 78 based upon voltage. A gap "y" is clearly visible between the isopotential contours, or lobe slices, 80, 84 in the middle region of the map, representing differences in electrical impedance between the saltwater 74 and sandstone pieces 76, 78. The highest potential difference is thus shown generated at the gap y, representing where the blocks 76, 78 were separated. The measured gap between the lobe slices 80, 84 is proportional to the actual gap x (FIG. 3) between the sandstone pieces 76, 78. Further, the length of the gap y corresponds with the length of the gap between the blocks 76, 78. A y-value was obtained in each successive isopotential map generated after adjusting the gap (x values) in the different runs. Results demonstrated linear relationship between x and y, as $y \propto x$. indicating this methodology can be used to determine underground fracture width and also length.

Figure 5:
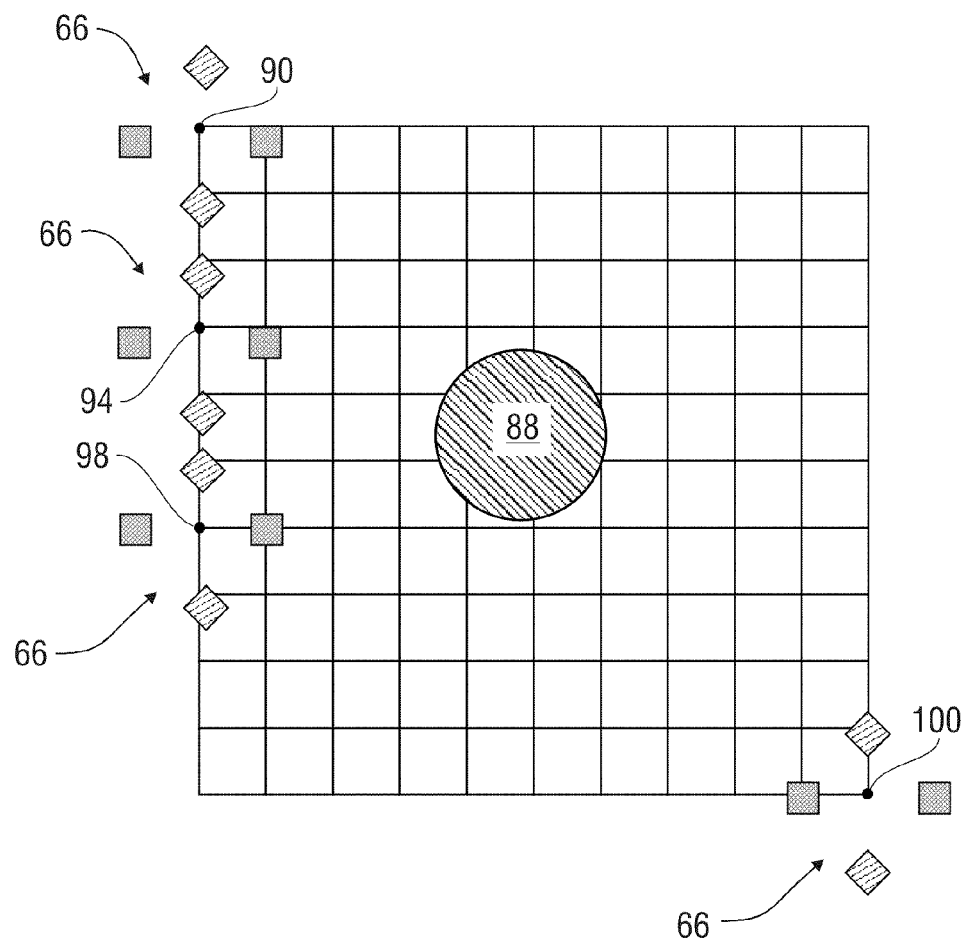
FIG. 5 is a schematic diagram showing the placement of an example electrode assembly relative to a hole formed in a sandstone piece used in a second example experiment to illustrate principals applicable in accordance with an embodiment of the present disclosure.

Experiment #2: measurement of diameters of the holes in a sandstone rock. Referring to FIG. 5, a piece of sandstone rock with a hole 88 was placed in the tank. The electrode assembly 66 was placed in a first position 90 above the sandstone rock relative to the hole 88 and the electric field potential was measured (by steps outlined above). The electrode assembly 66 was moved to a second position 94, then to a third position 98 etc. to the nth position 100 according to the grid pattern illustrated in FIG. 5 to cover the entire area over the rock, with electric field potential measured at each position.

Figure 6:
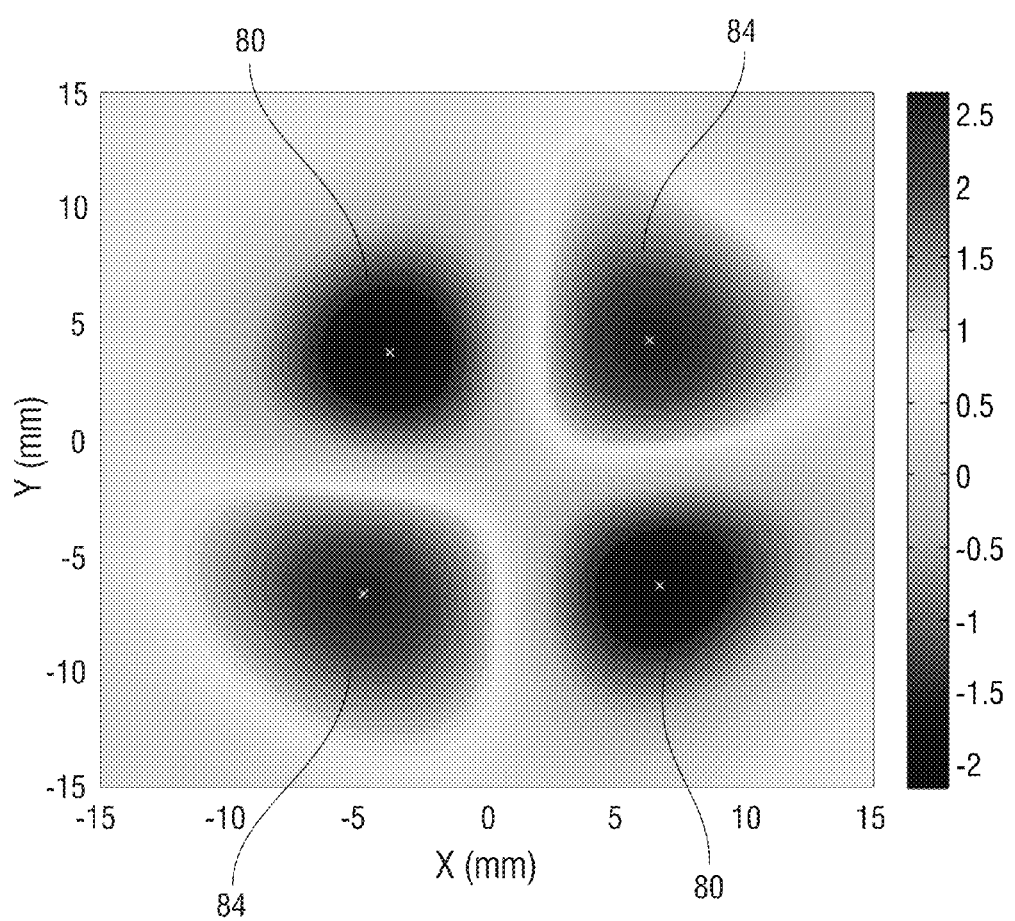
FIG. 6 is a two dimensional isopotential map from a three-dimensional graphical representation showing results generated in the second example experiment.

The information gathered was used to generate the electric field isopotential map shown in FIG. 6. The side bar indicates the electric potential in mV and the x and y axes correspond to the reading of coordinates. The distance between the centers (x) of the lobe slices 80, 84, or lobe peak radius (LPR), was measured and averaged.

Multiple shapes of sandstone rock with holes 88 of different diameters (ranging from 4 mm to 16 mm) were tested. Each sandstone rock was independently placed in the tank. The electric field potential was measured for each rock and an isopotential map produced. The average LPR was measured and calculated for each map.

Figure 7:
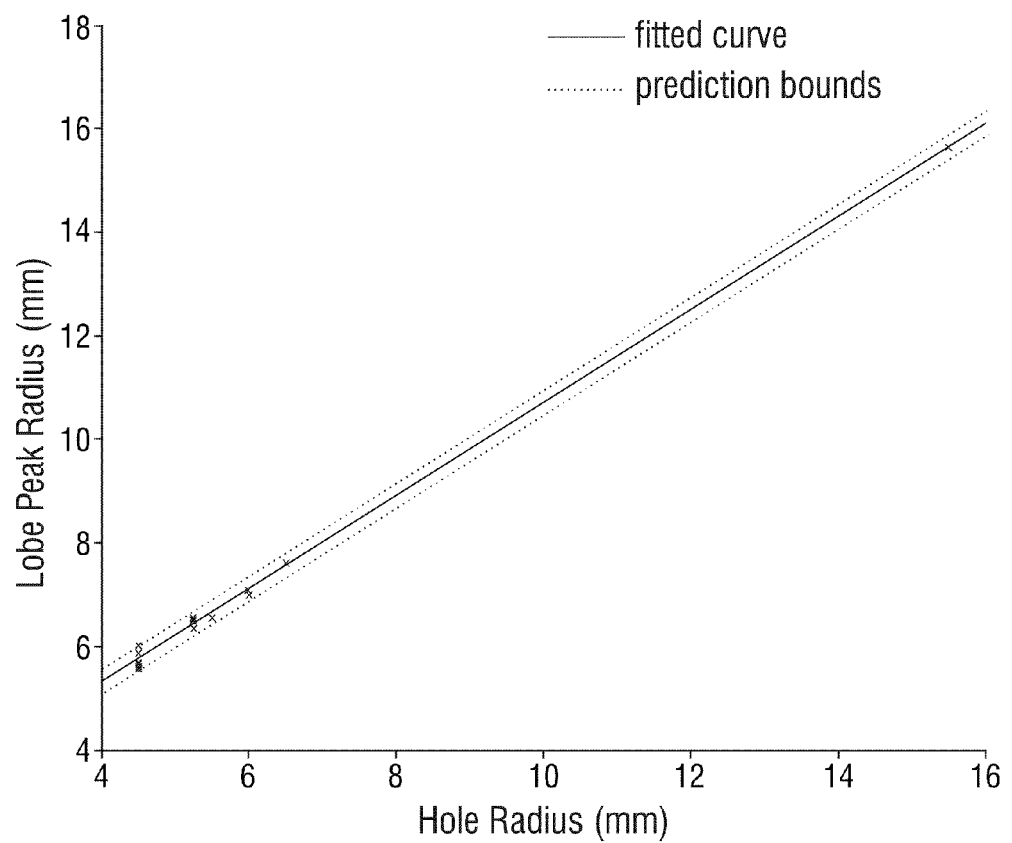
FIG. 7 is a graph showing results and predicted bounds deduced therefrom from the second example experiment.

The average LPR and corresponding hole radiuses were plotted in FIG. 7 (n=22) and generated the algorithm LPR=0.90*HR+1.71, where HR is the hole radius. The resulting fitted curve and prediction bounds shows a clear linear relationship between the diameter of the hole in each rock and the distance between the mapped lobes, indicating that the distance between the peaks x of the lobe slices 80, 84 is proportional to the hole diameter. In an application having a hole in a rock with an unknown diameter, and the average distance between the lobe centers will lead to the diameter of the hole. This experiment demonstrated that the diameter of a hole can be determined using electrolocation.

Figure 8:
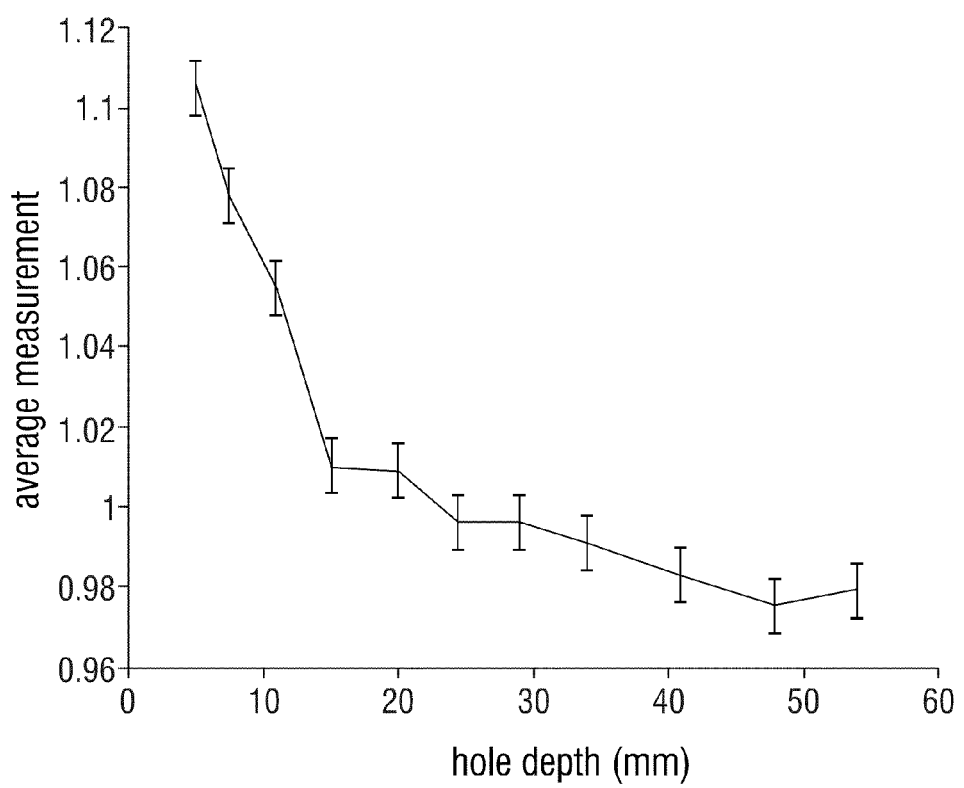
FIG. 8 is a graph of results from a third example experiment to illustrate principals applicable in accordance with an embodiment of the present disclosure.

Experiment #3: depth measurements of a hole or fracture in sandstone formation. In this experiment, two sensing electrodes and the two electric field emitter electrodes were embedded 15 mm deep into a sandstone rock placed in the tank. A 7 mm diameter hole was drilled in the center of the rock and 17 mm from each of the four electrodes. The depth of the hole 88 was increased gradually and the electric potential was measured at each increment of hole depth. An increase in hole depth leads to a change in the conductivity between electrodes, which creates a voltage differential. A relationship between the average voltage differential between electrodes and the depth of the hole was established, as shown in FIG. 8. The value of the hole depth was accurate up to at least three times the depth of the electrodes. Such a relationship indicates that electrolocation may be useful to measure the depth of a fracture or hole in a formation rock.

Preferred embodiments of the present disclosure thus offer advantages over the prior art and are well adapted to carry out one or more of the objects of this disclosure. However, the present invention does not require each of the components and acts described above and is in no way limited to the above-described embodiments, methods of operation, variables, values or value ranges. Any one or more of the above components, features and processes may be employed in any suitable configuration without inclusion of other such components, features and processes. Moreover, the present invention includes additional features, capabilities, functions, methods, uses and applications that have not been specifically addressed herein but are, or will become, apparent from the description herein, the appended drawings and claims.

The methods that are provided in or apparent from the description above or claimed herein, and any other methods which may fall within the scope of the appended claims, may be performed in any desired suitable order and are not necessarily limited to any sequence described herein or as may be listed in the appended claims. Further, the methods of the present invention do not necessarily require use of the particular embodiments shown and described herein, but are equally applicable with any other suitable structure, form and configuration of components.

While exemplary embodiments of the invention have been shown and described, many variations, modifications and/or changes of the system, apparatus and methods of the present invention, such as in the components, details of construction and operation, arrangement of parts and/or methods of use, are possible, contemplated by the patent applicant(s), within the scope of the appended claims, and may be made and used by one of ordinary skill in the art without departing from the spirit or teachings of the invention and scope of appended claims. Thus, all matter herein set forth or shown in the accompanying drawings should be interpreted as illustrative, and the scope of the disclosure and the appended claims should not be limited to the embodiments described and shown herein.

The invention claimed is:

1. An electrolocation system for approximating or determining at least one dimension of at least one fracture formed in an earthen formation from a subterranean well bore, the at least one fracture being at least partially located within a zone of interest in the earthen formation that is proximate to the well bore, the electrolocation system comprising:
   a fluid disposed in at least part of the well bore and at least one fracture;
   at least two spaced-apart electric current transmitting electrodes disposed in the well bore and configured to create an electric field between said electric current transmitting electrodes and proximate thereto in the zone of interest in the earthen formation;
   at least one target object disposed within the zone of interest outside the well bore and capable of creating perturbations in the electric field; and
   at least two spaced-apart sensing electrodes disposed in the well bore and configured to detect a difference therebetween in electric potential measured in volts caused by said at least one target object and provide data relating thereto for use in approximating or determining at least one dimension of at least one fracture,
   whereby at least one dimension of at least one fracture will be approximated or determined based upon data obtained in situ in the well bore with the use of electrolocation technology.

2. The electrolocation system of claim 1 wherein said electric current transmitting and said sensing electrodes are disposed upon at least one carrier.

3. The electrolocation system of claim 2 further including a plurality of said target objects, wherein said carrier is configured to be movable between multiple positions within the well bore to allow said electric current transmitting and sensing electrodes to be used to provide data useful for determining at least one dimension of multiple fractures in the formation at different intervals or angles along the well bore.

4. The electrolocation system of claim 2 wherein said carrier includes at least one among at least one wireline, coiled tubing and drill string.

5. The electrolocation system of claim 1 wherein at least one among said electric current transmitting and sensing electrodes are disposed upon or within casing or cement disposed within the well bore.

6. The electrolocation system of claim 5 wherein said electric current transmitting electrodes are configured to create an electric field in at least one zone of interest in the earthen formation and said sensing electrodes are configured to detect a difference therebetween in electric potential measured in volts created by at least one said target object substantially simultaneously with at least one among pumping fluid within the well bore and conducting other downhole operations.

7. The electrolocation system of claim 5 further including multiple said target objects and multiple sets of associated said electric current transmitting and sensing electrodes disposed at different locations upon or within said casing and/or said cement and configured to respectively create electric fields in multiple zones of interest in the earthen formation and detect differences in electric potential created by said multiple target objects from different locations in the well bore.

8. The electrolocation system of claim 1 wherein the at least one fracture is formed by hydraulic fracturing and said fluid includes fracturing fluid.

9. The electrolocation system of claim 8 wherein said at least one target object includes proppants.

10. The electrolocation system of claim 8 wherein said at least one target object includes at least one among a fracture surface of the earthen formation, a hole formed in the earthen formation and another geological feature of the earthen formation.

11. The electrolocation system of claim 8 wherein at least one among the width, height and length of a plurality of fractures may be approximated or determined based upon data obtained by said sensing electrodes during a single trip into the well bore.

12. The electrolocation system of claim 8 further including a plurality of said target objects, wherein each said target object includes at least one functionalized target object.

13. The electrolocation system of claim 12 wherein said at least one functionalized target object includes nanoparticles.

14. An electrolocation apparatus for approximating or determining at least one dimension of at least two geological features of an earthen formation from a subterranean well bore, at least a first geological feature being at least partially located within a first zone of interest in the earthen formation proximate to the well bore and at least a second geological feature being at least partially located within a second zone of interest in the earthen formation proximate to the well bore, the apparatus comprising:
   a fluid disposed in at least part of the well bore and in communication with the at least two geological features;
   at least two spaced-apart electric current transmitting electrodes positionable within the well bore and configured to create an electric field between said electric current transmitting electrodes and proximate thereto;
   at least one target object disposed within each zone of interest and capable of creating perturbations in an electric field extending therein, each said target object being at least one among a fracture, fracture surface or one or more objects disposed within a fracture; and
   at least two spaced-apart sensing electrodes positionable within the well bore and configured to detect a difference therebetween in electric potential created by each said target object at each respective zone of interest and provide data relating thereto for use in approximating or determining at least one dimension of at least one geological feature at each zone of interest,
   whereby at least one dimension of each among at least two geological features will be approximated or determined based upon data obtained in situ in the well bore with the use of electrolocation technology.

15. The electrolocation apparatus of claim 14 wherein the at least two geological features are fractures formed by hydraulic fracturing and said fluid includes fracturing fluid.

16. The electrolocation apparatus of claim 15 wherein said sensing electrodes are disposed upon at least one carrier, said carrier being configured to be movable between multiple positions within the well bore to allow said electric current transmitting and sensing electrodes to be used to provide data useful for determining at least one dimension of multiple fractures in the formation at different intervals or angles along the well bore.

17. An electrolocation method of approximating or determining at least one dimension of at least one fracture formed in an earthen formation by hydraulic fracturing from a subterranean well bore, the well bore including fluid, the at least one fracture being at least partially located within a zone of interest in the earthen formation proximate to the well bore, the method comprising:
providing at least two spaced-apart electric current transmitting electrodes in the well bore;
the electric current transmitting electrodes creating an electric field between them and proximate thereto in the zone of interest;
providing at least one target object within the zone of interest;
the at least one target object creating detectable perturbations in the electric field;
providing at least two sensing electrodes in the well bore; and
the at least two sensing electrode detecting a difference therebetween in electric potential caused by the at least one target object and providing data relating thereto to at least one computer to approximate or determine at least one dimension of at least one fracture formed in the earthen formation,
whereby at least one dimension of at least one fracture will be approximated or determined based upon data obtained in situ in the well bore with the use of electrolocation.

18. The electrolocation method of claim 17 wherein at least one target object includes at least one fracture surface of the at least one fracture.

19. The electrolocation method of claim 17 wherein the at least one target object includes proppants.

20. The electrolocation method of claim 17 wherein the at least one target object includes nanoparticles.

21. The electrolocation method of claim 17 further including altering the at least one target object based upon conditions in the well bore or earthen formation.

22. The electrolocation method of claim 17 further including
moving the at least two sensing electrode in the well bore, and
the at least two sensing electrodes, at multiple positions in the well bore, detecting differences therebetween in electric potential created by the at least one target object and providing data relating thereto to at least one computer to generate an isopotential map of at least one fracture.

23. The electrolocation method of claim 17 further including disposing the electric current transmitting and sensing electrodes upon or within casing or cement disposed within the well bore or at least one carrier movable within the well bore to provide data useful for determining at least one dimension of multiple fractures at different intervals or angles along the well bore.

24. The electrolocation method of claim 23 wherein the electric current transmitting electrodes are configured to create an electric field in at least one zone of interest in the earthen formation and the sensing electrodes are configured to detect a difference therebetween in electric potential created by at least one target object substantially simultaneously with pumping fluid within the well bore.

25. The electrolocation method of claim 23 further including providing at least two target objects, wherein the target objects are surfaces of two respective fractures, further including approximating at least one among the width, height and length of multiple fractures based upon data obtained during a single trip into the well bore.

* * * * *

UNITED STATES PATENT AND TRADEMARK OFFICE
CERTIFICATE OF CORRECTION

PATENT NO. : 8,253,417 B2  
APPLICATION NO. : 12/421061  
DATED : August 28, 2012  
INVENTOR(S) : Thomas J. Pisklak, Qi Qu and Russel L. Maharidge Page 1 of 1

It is certified that error appears in the above-identified patent and that said Letters Patent is hereby corrected as shown below:

On the Title page, items (12) and (75), replace "Pislak" with "Pisklak".

Signed and Sealed this  
Thirtieth Day of April, 2013

Teresa Stanek Rea  
*Acting Director of the United States Patent and Trademark Office*